Jan. 18, 1927.

A. E. COWLES 1,615,166

ELECTRIC WATER HEATER

Filed July 10, 1925

INVENTOR
ANDREW. E. COWLES.
BY Fetherston Huey &Co
ATT'YS.

Patented Jan. 18, 1927.

1,615,166

UNITED STATES PATENT OFFICE.

ANDREW EATHAN COWLES, OF KELLOGG, IDAHO.

ELECTRIC WATER HEATER.

Application filed July 10, 1925. Serial No. 42,793.

This invention relates to improvements in electric water heaters, and the objects of the invention are to provide a simply constructed, efficient and durable device of this character in which water can be quickly heated and superheated.

Further objects are to provide a device of this character in which the water having passed through the jacket becomes heated before entering the coils to be there subjected to the direct heat of the coils.

A still further object is the provision of steam pressure, the water being primarily heated in the jacket and then superheated passing through the coils.

Figure 1:
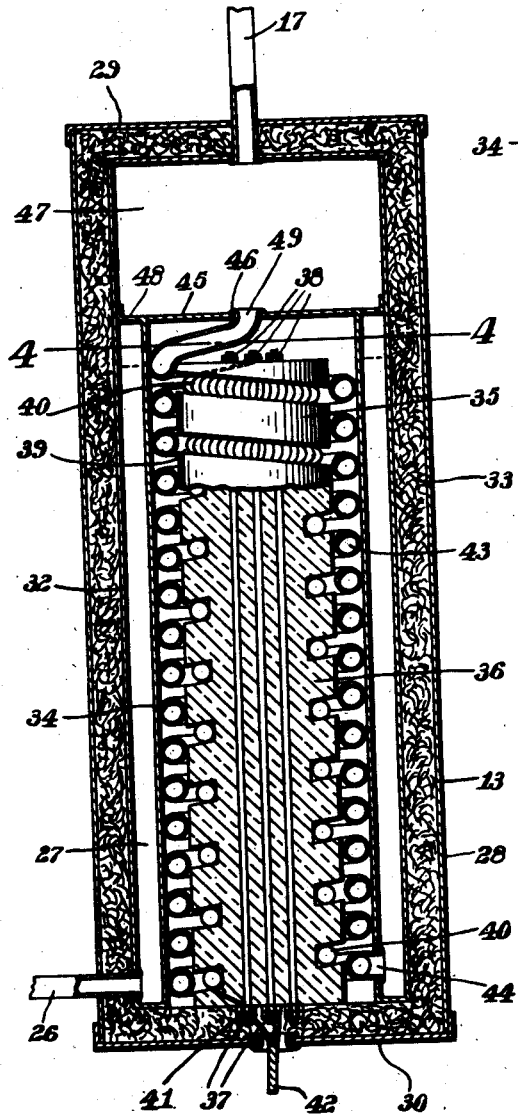
Figure 2:
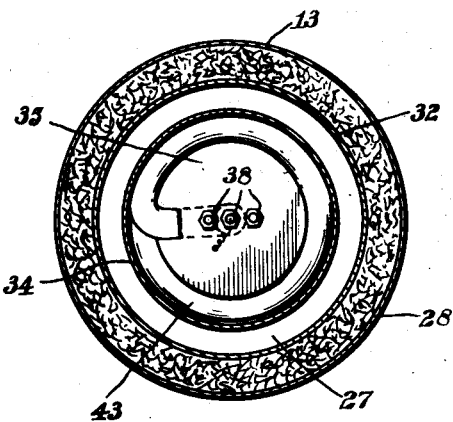
Figure 3:
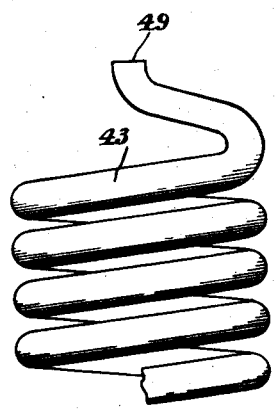

Referring now to the drawings in which like characters of reference indicate corresponding parts in each figure, Figure 1 is a vertical section through the heater tank, Figure 2 is a section on line 4—4 of Figure 1, and Figure 3 is a fragmentary detail in elevation of the worm or coil pipe, adapted to be wound around the heating element.

Referring now to the construction of my heater, which forms the essential feature of my invention, this consists, as herein disclosed, of the outer casing or tank 28 provided with suitable top and bottom end pieces or covers 29 and 30. Spaced from the outer casing 28 of the casing is an inner wall 32 and between these walls is packed a layer of suitable insulating material 33 whereby the casing 28 is completely insulated. Within the insulated casing 28, and spaced therefrom to form the water jacket 27, is an inner casing 34 within which is arranged a heating element 35 comprising a block or the like 36 of insulated material provided with terminals 37 and 38 and formed with a corkscrew recess 39 extending therearound from the top to the bottom and adapted to engage with the resistance 40 connected at 41, through the terminals 37, to the electric connecting means 42 extending to the source of power. Also coiled around the heating element 35, in worm formation as shown in Figure 3, is a water pipe 43 communicating, at its lower end at 44, with the water jacket 27. The inner casing 34, as illustrated in Figure 1, is of lesser height than the outer casing and is provided with a suitable top piece 45 extending thereacross and across the water jacket 27 and having therein a discharge opening 46 communicating with the coil-wound pipe 43, a chamber 47 being formed in the heater, between the top 45 of the inner casing and the top 29 of the outer casing, the apertures 48 permitting communication between the chamber 47 and the water jacket 27.

It will thus be evident that the water is quickly, efficiently and conveniently heated and then superheated by my improved device. It will also be noted that the construction, as described, is both simple and effective and that in the heater the combination, with the water jacket completely insulated from the casing and the wall 34 contacting with the coil wound pipes on the heating element within the inner casing, constitutes very effectual means for quickly and economically arriving at the object sought.

As many changes could be made in the above construction and many apparently widely different embodiments of my invention, within the scope of the claims, constructed without departing from the spirit or scope thereof, it is intended that all matter contained in the accompanying specification and drawings shall be interpreted in an illustrative and not in a limiting sense.

What I claim as my invention is:

In a device of the character described, the combination of a heater comprising an insulated heating member having a water intake and a hot water and steam discharge outlet remote from one another, an inner casing spaced from the outer casing to form a water jacket communicating with the water intake, the inner casing being of lesser length than the outer casing, an insulated block suitably channeled and provided with terminals for the inner casing, a resistance wound around said block in said channels, a water pipe worm wound around the block over the resistance, said pipe communicating at one end with the water jacket and at the other end with the steam and hot water discharge outlet and electrical means connected to said terminals whereby the water is first heated in the water jacket and then superheated in the coiled water pipe.

In witness whereof I have hereunto set my hand.

ANDREW EATHAN COWLES.